Dec. 24, 1929.  S. L. LEBBY  1,740,608
PROJECTOR
Filed Jan. 15, 1923   4 Sheets-Sheet 1
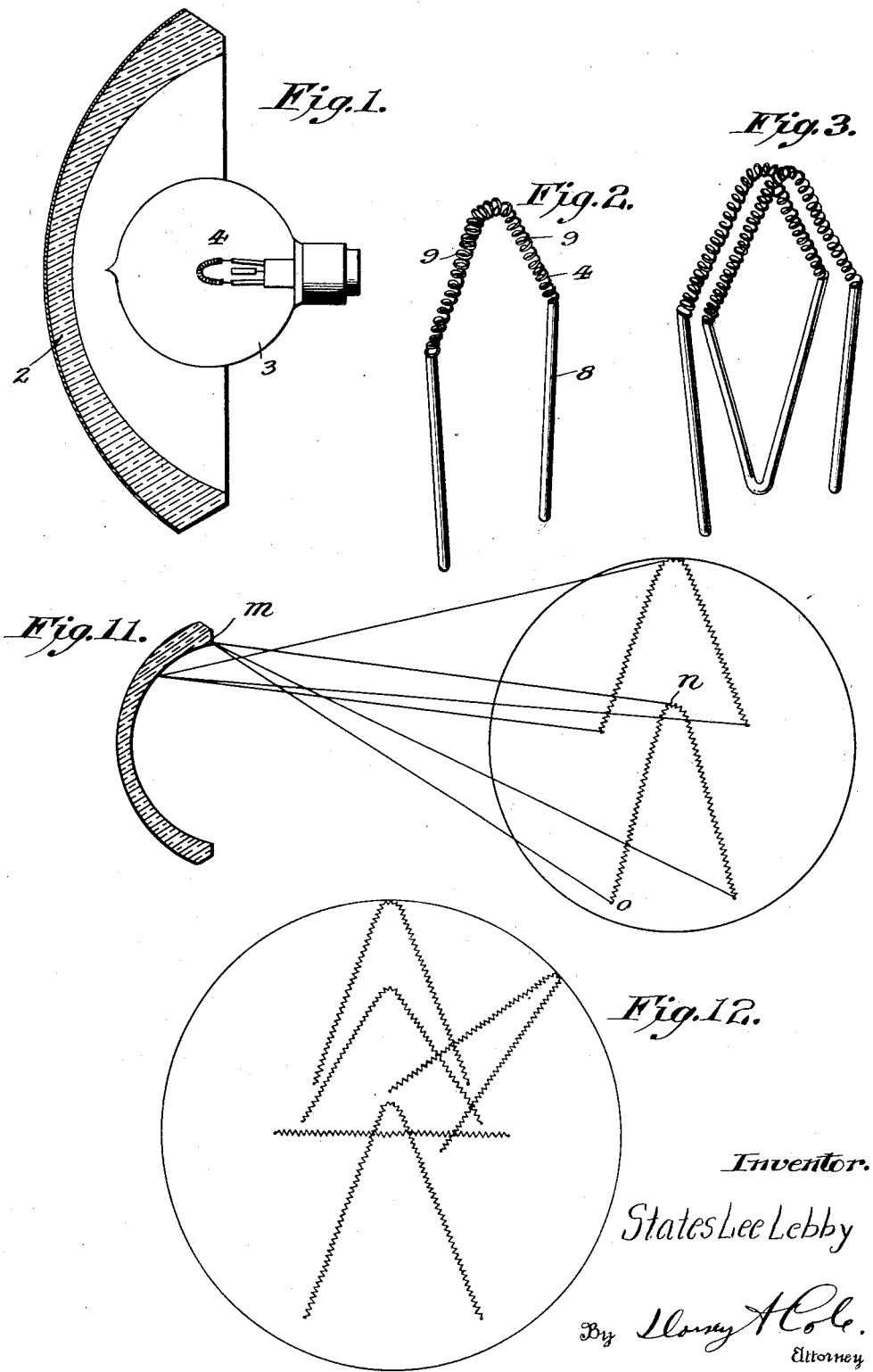
Inventor.
States Lee Lebby
By Lloyd A. Cole
Attorney Dec. 24, 1929.  S. L. LEBBY  1,740,608
PROJECTOR
Filed Jan. 15, 1923   4 Sheets-Sheet 2

Inventor
States Lee Lebby

By
Lloyd H. Cole.
Attorney

Dec. 24, 1929.      S. L. LEBBY      1,740,608
PROJECTOR
Filed Jan. 15, 1923      4 Sheets-Sheet 3
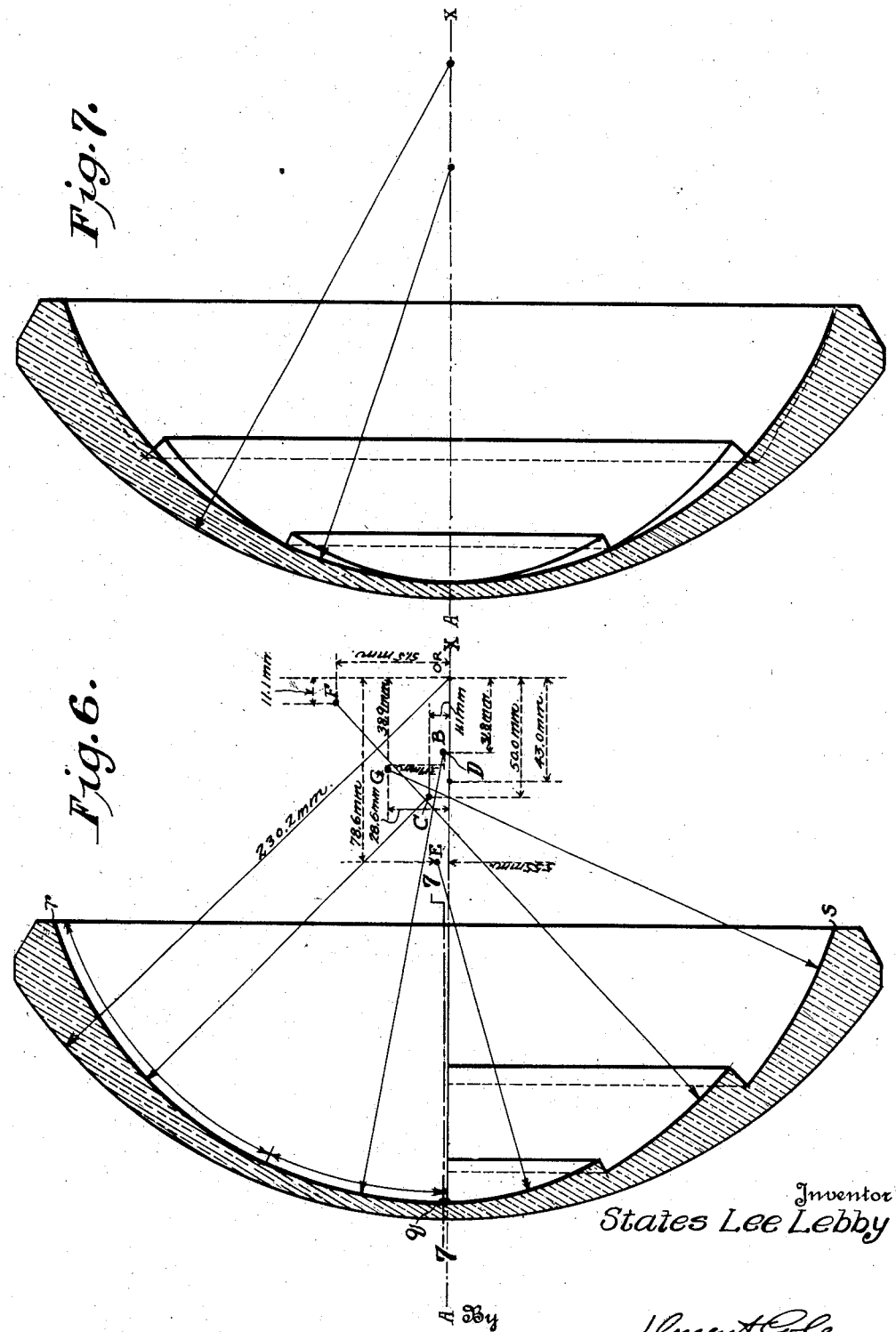
Inventor
States Lee Lebby Dec. 24, 1929.  S. L. LEBBY  1,740,608
PROJECTOR
Filed Jan. 15, 1923  4 Sheets-Sheet 4

Inventor.
States Lee Lebby
By Lloyd H Cole
Attorney

Patented Dec. 24, 1929

1,740,608

UNITED STATES PATENT OFFICE

STATES LEE LEBBY, OF CORNING, NEW YORK, ASSIGNOR TO CORNING GLASS WORKS, OF CORNING, NEW YORK, A CORPORATION OF NEW YORK

PROJECTOR

Application filed January 15, 1923. Serial No. 612,701.

This application is filed as a continuation in part of my prior application Sr. No. 428,917, filed December 7, 1920, and relates to an improved construction in projectors.

The improved construction forming the subject matter hereof, has for its object to obtain the efficient projection of a composite beam of light of such characteristics as to render it useful in automobile headlights, railway signals, etc.

These results are accomplished by an improved construction of the filament employed as the light source and by a mounting thereof whereby the light from such source, after projection from a mirror forming part of the projector, illuminates with practical uniformity a field whose dimensions will be determined by the dispersive spread of the mirror due to the filament employed and to the distance from the mirror on which the cross section of the beam is taken.

It further consists in an improved construction of a catadioptric reflector in which the convex rear face of the reflector is spherical, or substantially spherical, and in which, at least a part, specifically shown herein as the upper half, of the inner concave front face of the mirror is in vertical medial section so formed that in such medial vertical plane the catadioptric mirror with a selected light source has a selected dispersion due to the light source, points on such inner face of the mirror outside of such medial vertical plane being on a surface of revolution formed by rotating the curve of the inner face of the mirror at such medial vertical plane around an axis vertical to the principal axis of the mirror, and located between the center of curvature of the rear face of the mirror and of such rear face, so that increased divergence is thereby produced by points on the surface of the mirror at points away from the vertical medial plane over the dispersion at the medial vertical plane.

It further consists in the mirror, the lower part of which has its inner face in medial vertical section formed by a series of Fresnel zones so struck that different points in each zone on such medial vertical plane have varying divergence, points away from the vertical medial plane on the inner face of such last named part of the mirror being located on the surface of revolution formed by rotating the medial vertical section just referred to around the principal axis of the mirror.

Referring to the accompanying drawings in which corresponding parts are designated by similar marks of reference,—

Figure 1 is a horizontal section of a projector embodying my invention.

Fig. 2 is a plan view of a filament embodying my invention.

Fig. 3 is a modification of the filament shown in Fig. 2.

Fig. 6 is a vertical section through a mirror embodying this invention, illustrating the curvatures thereof.

Fig. 7 is a horizontal section through the same mirror immediately above the principal axis thereof.

Figure 11 is a diagram representing light projection from the V-shaped filament forming a part of this invention when used with a mirror such for instance as shown in Figure 1.

Fig. 12 is a section through the composite beam of Figure 11, showing the formation of V images.

Definitions

Figure 4:
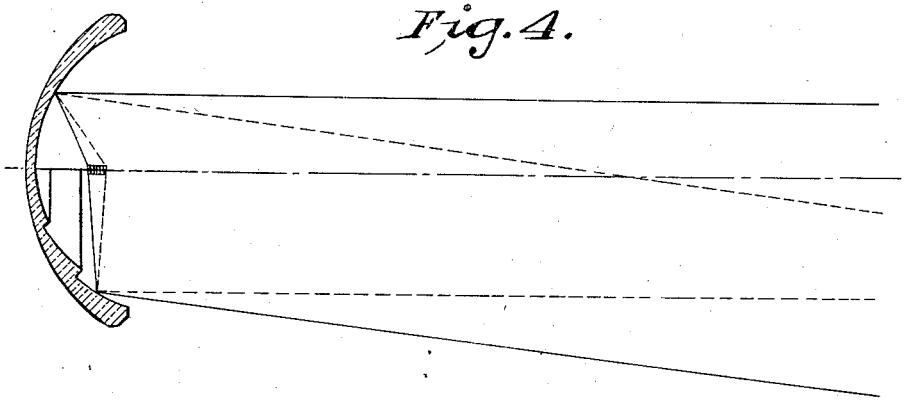
Figs. 4 and 5 are diagrams showing the vertical and horizontal spread of a mirror, when used with a V-shaped filament.

For purposes of certainty the following definitions are here given of certain terms used in this specification.

Dispersion

The angle between rays projected from the same point of the mirror, and emanating from opposite ends of the light source.

Divergence

The angle between the principal axis of the projector and the ray projected from any point of the mirror at the greatest angle to such axis.

Composite beam

The aggregate of all rays projected from all points of the mirror.

Spread

The diameter of the composite beam at a selected distance from the projector.

Figure 1 represents an optic element 2 in the form of a glass mirror silvered on its rear face. The light source is shown in the form of a lamp 3, the filament 4 of which forms a part of this invention.

The filament

I prefer to use the light source shown in Figure 2 consisting of a V shaped filament 4, having terminals 8, the two limbs 9 of the filament being in the horizontal plane of the axis of the mirror, with the apex of the filament directed towards the inner face of the mirror. The axis of this filament is preferably coincident with the principal axis of the mirror, although I may, if I so desire, superimpose several of such filaments, one about the other, as is shown in Figure 3, in which case, the lower filament or filaments will be parallel with the upper filament (which may be placed as before stated) and located vertically below the same. In the specific embodiment shown in the main figures of this application, each limb of the filament is approximately 9.6 mm. the spread of the rear ends of the filaments from center to center thereof is 8 mm., and the filament which is in the form of a helix or spiral, has the diameter of such spiral equivalent to 1.6 mm.

It is obvious that the exact V shape of the filament here described may be departed from, and that a substantially V shaped or a U shaped filament may be employed without departure from the principal of the invention herein indicated. Likewise, that the filament, instead of being V-shaped, or U-shaped, may, under certain aspects of this invention, be in the form of a straight helix located around the principal axis of the mirror, although such a filament will not produce all of the beneficial results following from the use of a proper V-shaped filament. Filaments such as have been heretofore discussed, will be hereinafter designated as axial filaments.

It will be obvious from a consideration of the optics of projection, that so far as concerns rays emanating from the filament horizontally and falling on the mirror, the straight helical filament is the equivalent of the V or U-shaped filaments whose limbs are in such horizontal plane. When, however, the projection of rays emanating from the filament in a plane parallel with the axis in other than the horizontal plane is considered, there is a difference between the two types of filaments as will be hereinafter pointed out. One marked advantage of the use of a substantially V-shaped filament is due to the fact that as I have found, the apex of such filament becomes more highly incandescent than other portions of the filament and thus serves as the source of rays of greater luminosity. This is due to the fact that at the apex the two limbs of the filament approach each other and mutually contribute heat to each other. I take advantage of this fact in my improved projection, as will be hereinafter pointed out.

The mirror

The mirror employed is a glass mirror having its rear convex face polished and silvered to cause reflections, and its anterior concave face properly shaped to cause refraction.

The construction of mirror which I prefer (but to which I do not restrict all aspects of my invention) to use in connection with a substantially V filament such as has been before specifically described is as follows,—

The curvature of the mirror is approximately determined to give with a selected location of the filament, a predetermined dispersion from a filament having a predetermined and selected length. That is to say, if the marginal rays of a beam projected from a point of the mirror and forming an image of the filament are to subtend an angle of 5°, the radius of the mirror is so determined that at the mirror the filament will subtend an angle of approximately 5°.

Figure 5:
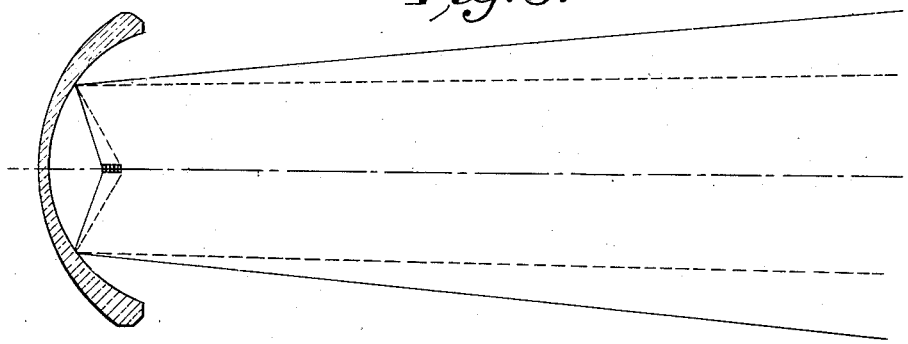
Figure 8:
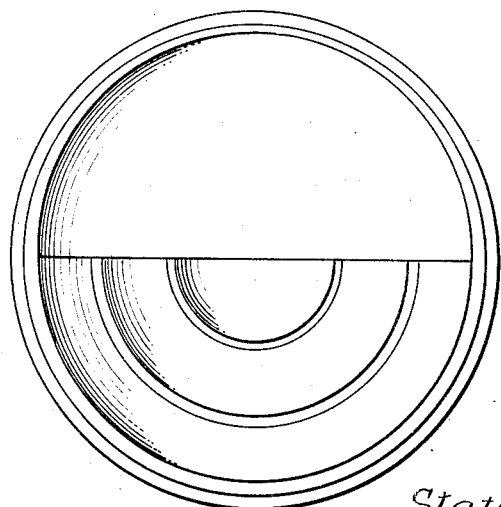
Fig. 8 is a front view of the mirror of Figs. 6 and 7.

In the following description, it is presumed that the filament is of the character before described; that the point of the filament is located at approximately 118.4 mm. from the rear face of the mirror, with a dispersion of 5°, the upper half of the mirror is to project rays emanating in a vertical plane from the apex of the filament parallel with the axis of the mirror, and to project rays emanating horizontally from the apex with a divergence of 2½° from the axis of the mirror; that the lower half of the mirror is to divergently project all rays projected thereon from all points of the filament, and that the glass from which the mirror is made has a refractive index of 1.53. The divergence here discussed is represented in vertical and horizontal planes in Figures 4 and 5, respectively.

The rear face of the mirror is spherical, this tending to convenience in manufacture, and is struck with a radius of 230.2 mm. from center OR located in the axis A—X of the mirror.

The front or interior concaved face of the mirror may, for convenience of description, be divided into an upper and a lower half.

*The upper half.*—Considered in vertical section the main face of this is formed by two curves, the one forming the inner part of such face being struck around a center B located 31.8 mm. in the rear of the point OR and 3.17 mm. above the axis A—X. The curve for the outer portion of such face is struck from a center C located 50.0 mm. in the rear of the point OR and 11.1 mm. above such axis.

Figure 9:
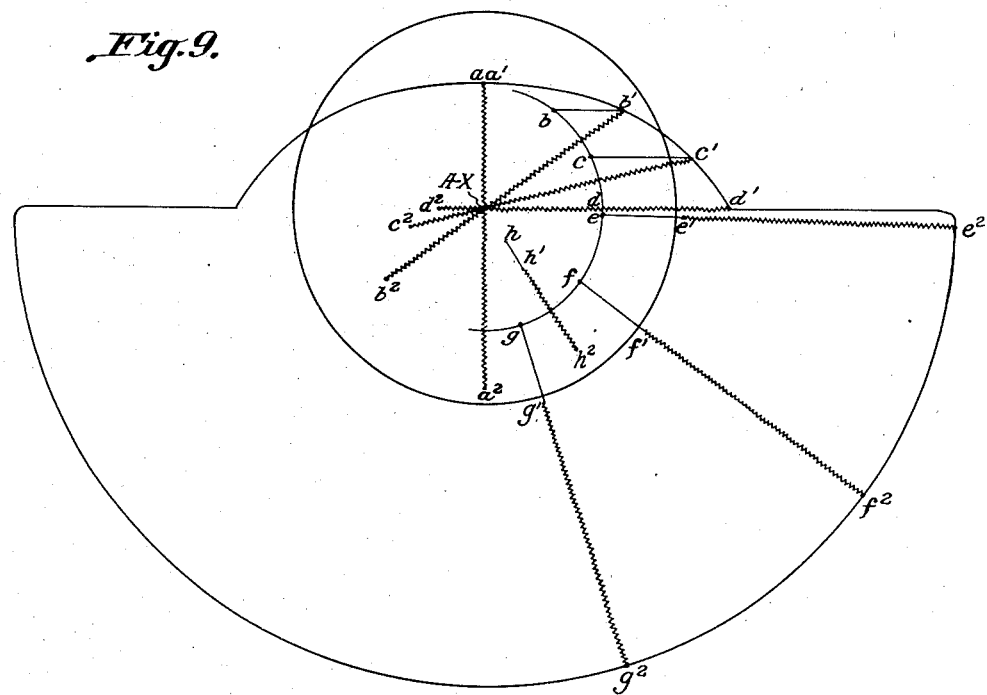
Fig. 9 is a view taken through the composite beam at close proximity to a mirror such as that shown in Figs. 6 to 8, showing the effect produced on certain selected rays.
Figure 10:
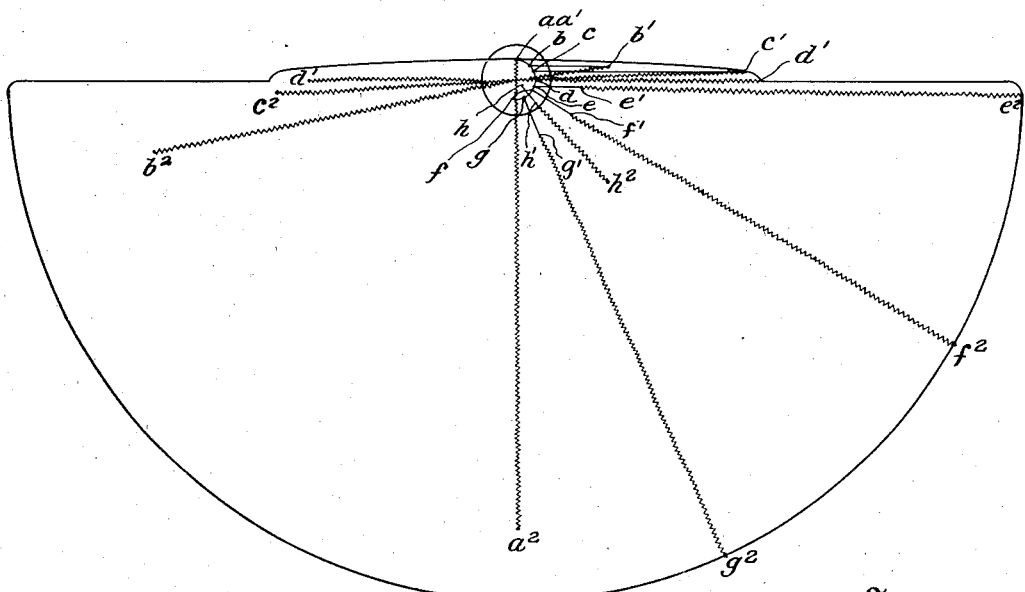
Fig. 10 is a similar view taken at a point more remote from the mirror than Fig. 9, and therefore on a reduced scale.

Points on the inner face of the upper half of the mirror on each side of the medial vertical plane before discussed all lie on a surface of revolution formed by revolving the curved faces above described around a vertical axis which intersects the axis A—X at a point D located 43 mm. in the rear of the point OR. From this it follows that the average radius of the inner face of the upper half of the mirror when measured in other sections than the vertical, is less than the average radius of the inner face of the mirror when measured on the vertical section, thus increasing the prism effect toward the horizontal section over that in the vertical section, as is represented in Figures 6 and 7, thereby tending by reason of greater spherical aberration, to cause the greater divergence of the beam horizontally than vertically, as is represented in Figures 9 and 10.

Considering a point on the inner surface of the mirror at a given distance from the axis, in a plane oblique to both the horizontal and vertical planes before discussed, it will be noted that the vertical component of the divergence due to the reflective action of the mirror alone at such point is less than the divergence due to such action at a corresponding point in the vertical plane of the mirror. On the other hand, the divergence due to refractive action at such point in the oblique plane is greater than the divergence due to refractive action at the corresponding point in the vertical plane. Therefore, refractive action at points in such oblique planes tend to compensate for the decrease of vertical reflective action at such points. This permits a flat and very accurate cut-off of the upper part of the beam, in that the vertical components of divergence at all points in the upper half of the mirror are substantially the same.

*The lower half.*—This is formed as a Fresnel in three zones. Considering the medial vertical section, as was in the case of the consideration of the upper half of the mirror, each of these zones has at different points at different distances from the axis, different diverging power, the intermediate zone giving on the whole, the greatest divergence. As shown, the inner zone is struck from a point E as a center, 78.6 mm. in the rear of the point OR, and 5.55 mm. above the axis. The intermediate zone is struck from a center F 11.1 mm. in rear of point OR, and 51.5 mm. above the axis. The outer zone is struck from a center G, 38.9 mm. in the rear of the point OR, and 28.6 mm. above the axis.

Points on the inner face of the lower half on each side of the medial vertical plane before discussed all lie on a surface of revolution formed by revolving the Fresnel faces so formed around the principal axis of the mirror as a center. From this results that the prism angle formed by the exterior and interior faces of the mirror, are constant for all points in the lower half of the mirror located at the same distance from the axis of the mirror, and this, irrespective of the obliquity of the plane in which they are located, which is not true of the upper half of the mirror in which the prism angle constantly changes as before pointed out.

Beam projection

With the construction before discussed, it will be seen that all rays emanating from the apex of the filament and falling on the upper surface of the mirror at points in the same horizontal plane are projected by the latter in a horizontal plane, the planes of projection being, however, different for points on different horizontal planes of the mirror, and that dispersion arising from the length of the filament causes the rays from the limb of the filament to be projecting downwardly below such planes. It thus follows that the rays from the apex of the filament so projected by the upper half of the mirror are projected between the horizontal plane of the axis of the mirror and the horizontal plane of the top of the mirror. This gives what is technically known as a flat top cut-off. This cut-off is not interfered with by beams emanating from the lower half of the mirror as no rays forming part of such beams converge towards the axis or upwardly, though certain of such last named rays, i. e., those from the rear end of the filament contribute to the intensity of the beam at points slightly below the cut-off. However, rays from the apex of the filament falling on the bottom half of the mirror are projected divergently to the axis of the mirror downward or sideways to fill out the beam at its bottom or at its sides. The formation of a field of illumination by the structure here discussed is graphically disclosed in Figures 9 to 10. Each of these figures is a transverse section of a composite beam, Figure 9 being supposed to be taken slightly in front of the projector while Figure 10 is one taken at a greater distance therefrom, and is necessarily upon a much smaller scale.

Considering projection from the upper half of the mirror of rays emanating from the apex of the filament, the point $a$ in the vertical plane of the mirror projects a ray parallel with the principal axis A—X, points $b$ and $c$ not in either the medial vertical or horizontal planes, each project rays $b$—$b'$, $c'—c'$, divergently in a horizontal plane, and the point $d$ in the medial horizontal plane projects the ray $d—d'$ horizontally. It will be noted that these rays differ among themselves in horizontal divergence. Considering projection from the upper half of the mirror of rays emanating from the rear end of the filament, and presuming, for simplicity, that such filament is of pencil shape, concentric with the principal axis of the projector, such rays are projected downwardly by the point $a$, to $a^2$ forming the beams or image $a'—a^2$ etc. Likewise $d$ projects the ray from the rear end of the filament to $d^2$, forming the beam $d'—d^2$.

In the bottom half of the mirror, rays projected by the points $e, f, g$ and $h$, and emanating from the rear end of the filament, are displaced more or less radially in the field of illumination in respect to such axis, as shown by the ray $e—e'$, etc., the rays such as $h—h'$ projected from the inner zone of the mirror being substantially parallel with the axis, and thus contributing to the building up of a strong central field. Rays from the apex of the filament falling on the same points in the lower half of the mirror are projected to $e^2, f^2$, etc., forming the beams $e'—e^2$, etc.

It will be noted that the convexity produced in the top of the field of illumination of Figure 9 by the points $a, b, c$, becomes negligible when the field of illumination spreads, due to the increase of distance from the projector as is illustrated in Figure 10

It will be noted that each of the beams $a'—a^2, b'—b^2$, etc., before discussed, forms an image of the filament, and that the composite field of illumination is made up of an infinite number of these filament images. The brightest spots in the field coincides with the intersection of the greatest number of images. To produce uniform illumination of the field, it is necessary, therefore, that the point of intersection of the filament images be uniformly distributed over the field. For certain purposes, this uniformity of distribution is desired. For other purposes, it is desired that the intersections be so distributed as to produce a portion of high luminosity surrounded in whole or in part, by zones of decreasing luminosity. It is the latter type of field which is specifically shown in the drawings here before discussed, in that a point of high luminosity is formed around the axis of the mirror, and that laterally and below such axis the field decreases In the above mentioned diagrams the filament has been considered as a pencil filament formed by a straight helix. If however, the filament is an axial V or rounded U filament, the principle of projection is not modified, but the above desirable results are more effectively obtained, since the top of the field of illumination near the cut-off will comprise all of the highly incandescent and more luminous V filament apices projected from the entire upper half of the mirror. Illustrated in Figures 11 and 12, the mirror is presumed to be one having any correction for spherical aberration within rather wide limits, and having a dispersion such that the most convergent ray $m—n$ from the apex of the filament after projection by the mirror does not cross the principal axis A—X within the working distance of the mirror. The projection from any point of such mirror of a beam of rays emanating from a limb of a filament will form a beam $n—o$, which will be in the plane cutting the limb and the point of the mirror on which the light under consideration strikes. Inasmuch as the limb of the filament is at horizontal angle to the axis, such plane, except for points on the horizontal medial axis of the mirror, will be at an angle to the vertical and horizontal planes of the axis of the mirror. If the projection of beams from both limbs of the V filament are considered, it will be seen that each point of the mirror is the source of two beams, the upper edges of which are coincident, and the lower edges of which diverge away from each other and away from the axis, the intersecting edges of such beams as is shown in Figure 12, being due to rays emanated from the filament apex, and being located around the principal axis of the mirror. It will be further noted that in each case, the ray from the filament apex is the outer edge of such beams when considered in respect to the principal axis of the mirror, (which passes through the filament images between the limbs thereof), and thus the field of illumination is made up of an infinite number of pairs of beams, each pair being united at the outer edges, the plane of each beam of one pair crossing the plane of the opposite beam of adjacent pairs. It will be further noted that the beams projected from points in the medial vertical plane of the mirror are at the maximum angle to each other, and that this angle decreases as the projecting point of the mirror approaches the horizontal medial plane. Moreover, as the point of projection of the mirror moves away from the axis, the vertical angle between the two planes decreases. From this it follows that unless the mirror is distended vertically and horizontally, the points of intersection of the planes of beams projected from points on the mirror away from the medial horizontal plane, are distributed uniformly over the whole field of illumination, and that the outer limits of the latter is defined in actual operation by the apices of pairs of planes, such apices being projected by points of maximum divergence of the mirror. Inside of this circle of illumination will be an infinite number of other circles of similar illumination due to lack of uniformity in divergence of points on the mirror at different distances from the axis thereof. On the field produced by these V images, will be superimposed the horizontal image of the filament, this extending horizontally across the field. This feature of the use of the V or U shaped filament with its point towards the mirror I claim as new when combined with a mirror having the characteristics before described by which the benefit of my invention is obtained.

Inasmuch as the apices are the most intensely luminous part of the filament, and that the images of the limbs of the filament are projected inside of the circle of apex images so formed, the field is brilliantly illuminated up to such circle, and thus abruptly ceases.

Having thus described my invention what I claim is:—

1. A projecting mirror having a reflecting rear spherical face and having a refracting forward face, the upper part of the latter of which is formed by the revolution of a curve around a vertical axis, and having greater positive spherical aberration in a horizontal than in a vertical plane, and a lower part of which is formed by rotating a plurality of curved zones around a horizontal axis.

2. A projecting mirror having a spherical reflecting rear face and a refracting front face, the upper and lower parts of such front face having different curvatures, an upper part of the front face being formed by rotating a curve around a vertical axis, and a lower part of the front face being formed by rotating a curve about a horizontal axis.

3. A projecting mirror having a spherical reflecting rear face and a refracting front face, an upper part of the latter of which is formed by rotating a curve around a vertical axis, and a lower part of which is formed by rotating a curve about a horizontal axis, the upper part having greater positive spherical aberration in horizontal plane than in vertical plane, and the lower part having a still greater positive aberration.

4. A projecting mirror having a reflecting rear spherical face and having a refracting forward face, the upper part of the latter of which is formed by the revolution of a curve around a vertical axis, and having greater positive spherical aberration in a horizontal than in a vertical plane, and a lower part of which is formed by rotating a plurality of curved zones around a horizontal axis, the lower part being of greater positive spherical aberration.

5. In a projector, the combination of a mirror having a reflecting rear spherical face, and having a refracting forward face, an upper part of which latter has greater positive spherical aberration in horizontal than in vertical planes, and a lower part of which has still greater positive spherical aberration, with a light source consisting of a substantially V-shaped filament with its apex towards the mirror, and its limbs in substantially the same horizontal plane.

6. A projecting mirror having a spherical reflecting rear face and a refracting front face, an upper part of the latter of which is formed by rotating a curve around a vertical axis, such upper part having greater positive spherical aberration in horizontal plane than in vertical plane.

7. A projecting mirror having a spherical reflecting rear face and a refracting front face, an upper part of the latter of which is formed by rotating a curve around a vertical axis, such upper part having greater positive spherical aberration in horizontal plane than in vertical plane, in combination with a light source so arranged with respect to the mirror that such upper part projects the end of the light source nearest the mirror into a substantially flat cut-off of the field of illumination.

In testimony whereof I hereunto sign my name.

STATES LEE LEBBY.